UNITED STATES PATENT OFFICE.

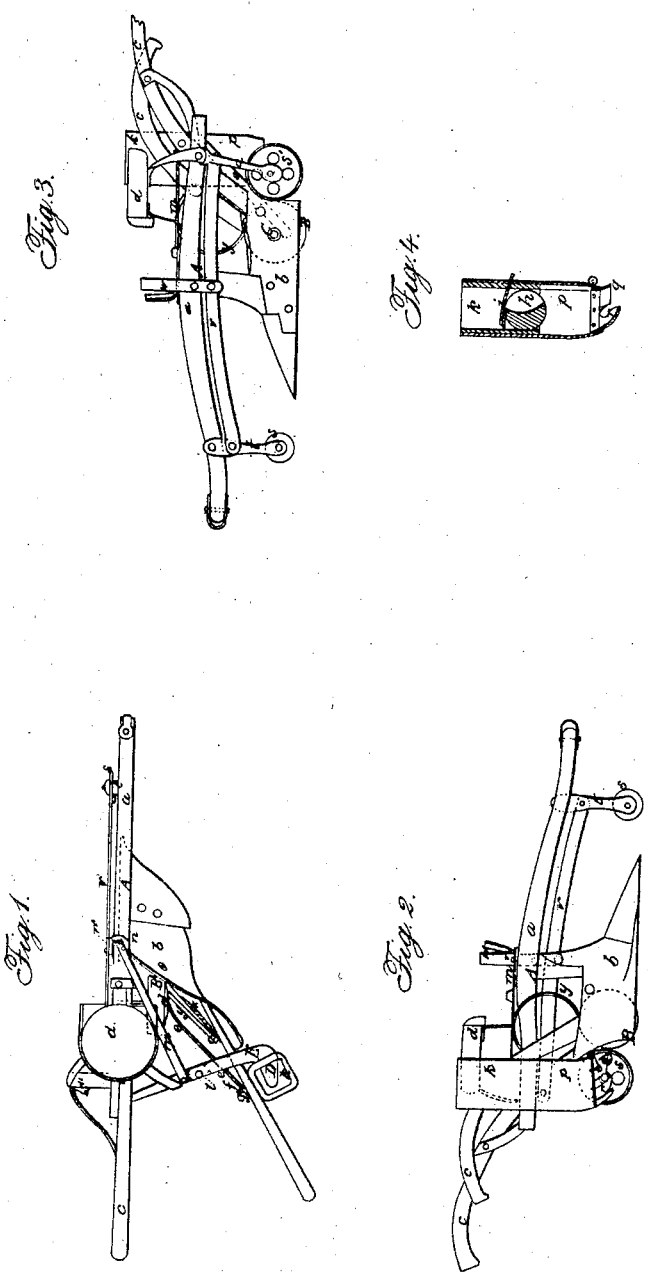

JAMES M. MAXWELL, OF CAPE ELIZABETH, MAINE.

IMPROVEMENT IN SEED-PLANTERS.

Specification forming part of Letters Patent No. 45,257, dated November 29, 1864; antedated December 13, 1863.

*To all whom it may concern:*

Be it known that I, JAMES M. MAXWELL, a resident of Cape Elizabeth, in the county of Cumberland and State of Maine, have invented an Improved Planting-Machine; and I do hereby declare the same to be fully described in the following specification and represented in the accompanying drawings, of which—

Figure 1 is a top view, and Figs. 2 and 3 are side elevations, of it.

The nature of my invention consists in the combination as well as the arrangement of a seed-dropping apparatus, a furrow opener and closer, with the plow, and a wheel arranged in the heel of the latter; also, in the combination of a gate and its operative mechanism with the seed-dropping apparatus and the plow; also, in the combination of certain wheels and their operative mechanism with the plow and a wheel arranged within the heel of the latter, as hereinafter described; also, in a flexible conductor and arm as disposed on or applied to the hopper and the plow, as and for the purpose as hereinafter described.

In the drawings, A denotes a common plow, of which $a$ is the beam; $b$, the mold-board, and $c\ c$ the handles. It also has a driver's seat, $d$, arranged on it. Within the heel of the plow there is a wheel, B, which is fixed on a transverse shaft, C, which has a bell-crank, $d'$, from which a connecting-rod, $e$, extends to a crank, $f$. This latter crank is on the shaft $g$ of a valve, $h$, applied to the discharging-orifice $i$ of a seed-hopper, $k$. (See Fig. 4, which is a vertical section of the seed-dropping apparatus.) The said hopper is affixed to one of the handles $c\ c$, and is arranged just in rear of the extremity of the mold-board. It has a gate, D, which extends and works through its side and over the said orifice, and is projected from a lever, E, whose fulcrum is at $l$. To the shorter arm of this lever an operating and holding latch, $m$, is jointed and arranged, as shown in the drawings. This latch, when the gate is in place over the orifice $i$, is intended to catch on a pin or stud, $n$, and in consequence thereof the gate will be kept in place so as to prevent any seeds from falling through the orifice, even when its valve may be in movement. By drawing back the latch in a longitudinal direction the gate will be forced out of the hopper. The object of the gate and its operative mechanism is to enable the plowman to arrest the planting of seed at such times as the same may be necessary while the plow may be in use. The said hopper has a spout, $p$, leading downward in rear of a furrow-opener, $q$, in the rear of which are two coverers, $r\ r$, which serve to cover the furrow made by the opener $q$. On the opposite side of the plow are two wheels, $s\ s'$, each of which is supported in a movable arm, $t$ or $u$. These arms are jointed to the plow-beam, and are connected by a connecting rod or bar, $v$, which, at its ends, is jointed to the two arms. This bar $v$, at its middle, is jointed to a lever, $w$, by moving which the wheels may be either forced downward so as to rest on the ground and raise the plowshare off the same, or such wheels may be so raised as to let the share rest on the ground. The wheel at the heel of the plow also projects the bottom of the share, and, with the two wheels $s\ s'$, serves not only to keep the share off the ground, but to enable the plow to be moved along its surface without the friction and consequent wear of the share thereon.

The spout or conductor $p$ is to be made of leather, canvas, or some other suitable flexible material, as the furrow-opener and the coverers are to be affixed to an arm, $x$, pressed downward by a spring, $y$, the said arm being hinged at its front end to the mold-board. In case the furrow-opener may be borne against a stone or other obstacle tending to injure it, the yielding arm will permit such furrow-opener, with the coverers, to rise over such obstacle or give way under its pressure.

With my said machine not only can land be plowed, but the earth that may be turned out of a furrow made by the plow may be planted by means of the seed-planting apparatus. The planting-machine while being transported from place to place may also be so raised off the ground and supported by wheels as to prevent the share from running in contact with the surface of the ground and injuring either it or such surface.

I claim—

1. The combination as well as the arrangement of the seed-dropping apparatus and its furrow opener and closers with the plow and the wheel arranged in the heel of the latter.

2. The combination of the gate D and its operative mechanism—viz., the lever E and latch m—with the seed-dropping apparatus and the plow.

3. The combination of the wheels s s' and their operative mechanism—viz., the arms t u, bar v, and lever w—with the plow and the third wheel B, arranged within or at the heel of the plow, as specified.

4. The improvement by which the furrow opener and closers are enabled to pass a stone stone or obstacle, the same consisting in the flexible conductor and the yielding supporting-arm, the same being applied to the hopper and the plow in manner and so as to operate substantially as specified.

JAMES M. MAXWELL.

Witnesses:
R. H. EDDY,
F. P. HALE, Jr.